No. 635,671. Patented Oct. 24, 1899.
F. H. DAWES.
PLOW.
(Application filed July 18, 1899.)
(No Model.)

WITNESSES:

INVENTOR
F. H. Dawes
BY
ATTORNEYS

UNITED STATES PATENT OFFICE.

FRANKLIN HOWLAND DAWES, OF EL RENO, OKLAHOMA TERRITORY.

PLOW.

SPECIFICATION forming part of Letters Patent No. 635,671, dated October 24, 1899.

Application filed July 18, 1899. Serial No. 724,255. (No model.)

*To all whom it may concern:*

Be it known that I, FRANKLIN HOWLAND DAWES, of El Reno, in the county of Canadian and Territory of Oklahoma, have invented a new and Improved Plow, of which the following is a full, clear, and exact description.

The object of my invention is to construct a plow particularly adapted to localities where the rainfall is limited and which will loosen and level the soil without turning under the crust of dry soil on the surface, as is done with the moldboard of the plow, so that when the grain is sown it will be placed directly in moist soil.

Another object of the invention is to provide a scaling or surface share and a vertical cutter at the landside of the share so shaped that it will turn the soil away from the beam and to provide adjustable teeth at the rear of the share adapted to loosen the soil as it passes over the share and back into the furrow.

Another object of the invention is to provide the plow with a combined leveling and pulverizing device and means for raising and lowering the device, regulating the ends of the rake-head of the device to the furrow, and for setting the rake at an angle or straight and even with the furrow.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
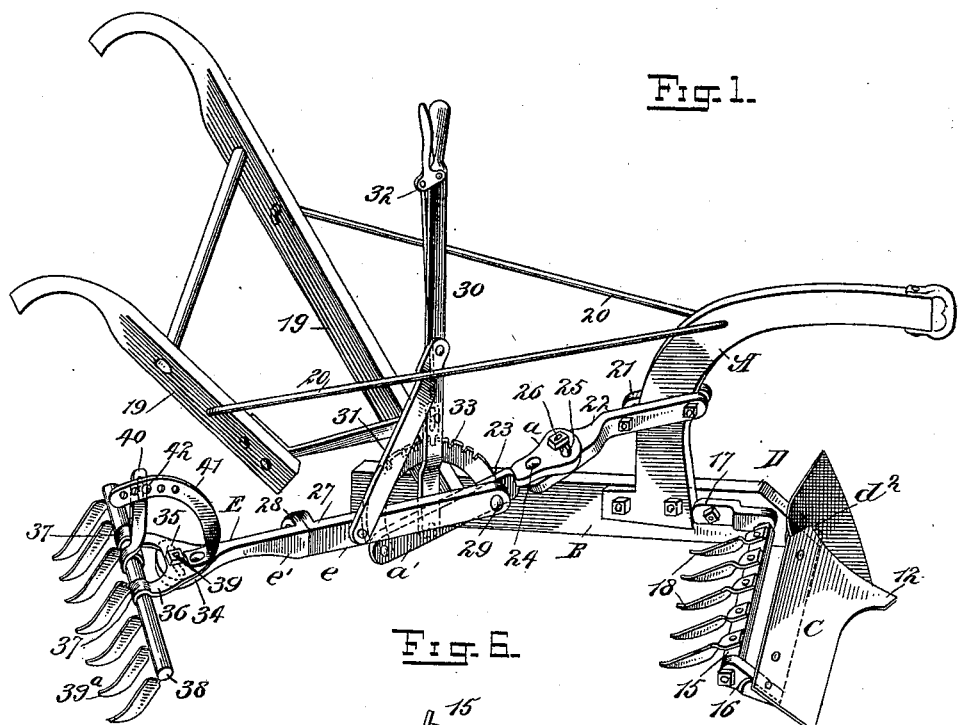
Figure 2:
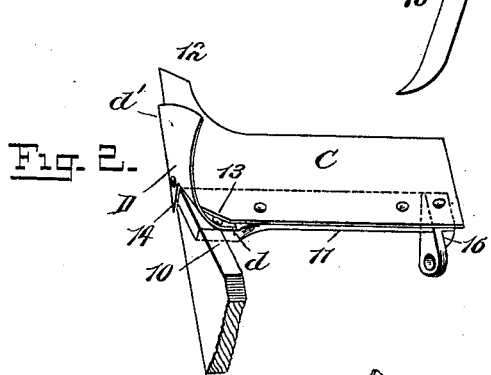
Figure 4:
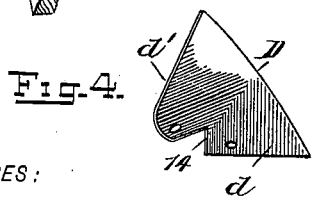
Figure 5:
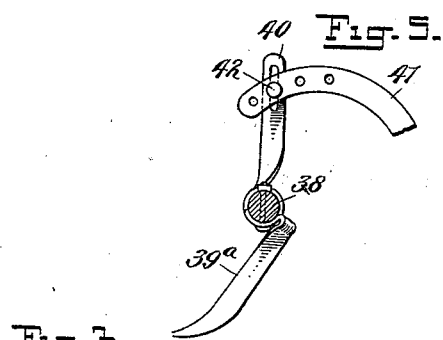
Figure 3:
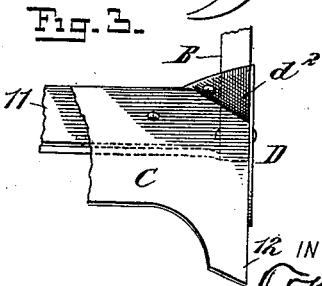

Figure 1 is a perspective view of the improved plow and its attachments. Fig. 2 is a detail perspective view of the share and cutter used in connection therewith together with a portion of the landside. Fig. 3 is a plan view of the landside end of the share and a plan view of the cutter. Fig. 4 is a detail view of the cutter that is attached to the share and landside. Fig. 5 is a vertical section through the rake-head of the leveling and pulverizing device; and Fig. 6 is a transverse section through the bar carrying the teeth located immediately at the rear of the share, showing one of the said teeth in side elevation.

The beam A and landside B may be of any desired length, and the forward end of the landside B is provided with an inclined upper edge 10, the inclination being downward and forward, as shown in Figs. 1 and 2. A plate 11 is firmly secured at one of its ends on the beveled surface 10 of the landside following the inclination of said surface, as shown in Fig. 2, and this plate 11 is adapted to carry a share C, which follows the inclination of the plate 11 and the surface 10 of the landside. This share is attached to the plate by rivets or equivalent means, and at the lower portion of its landside end a point 12 is formed, while the upper edge at the landside end is cut away, as indicated at 13 in Fig. 2. This is done in order that the landside end of the share C may be free from its supporting-plate 11 and have more or less of an upward inclination.

A cutter D is located at the landside end of the share. This cutter is provided with a notch 14 in one of its edges, as shown in Fig. 4, so that the lower edge of the upper portion $d$ of said cutter may be carried over upon the plate 11, supporting the share, to a point below the cut-away portion of the share, as is particularly shown in Fig. 2, while the lower end of the opposing portion $d'$ of the said cutter may be carried downward to an engagement with the left-hand side of the landside B. Suitable bolts are used for securing the two portions of the cutter to their respective supports, and the upper rear portion of the cutter under this construction is provided with a decidedly-curved inner surface $d^2$, as shown in Figs. 1 and 3, which surface tends to direct the soil away from the beam A to the rear edge of the share C. The forward or cutting edge of the cutter D inclines downwardly in direction of the point of the share.

A bar 15 is pivoted at the rear of the share C, the ends of the bar being mounted to turn in brackets 16 and 17, the bracket 16 being secured to or projected from the heel of the plate 11, while the bracket 17 is secured to the inner or right-hand surface of the landside, as shown in Fig. 1. The bar after it has been adjusted on its trunnions may be held in its adjusted position by placing suitable nuts on the outer ends of the trunnions, which portions are threaded.

A series of teeth 18 is secured to the bar 15. These teeth are at an opposite angle to the share C, extending downwardly and rearwardly, but the teeth may be given any desired inclination by the adjustment of the bar 15, referred to. These teeth 18 are preferably provided with flat or horizontal shanks that are secured to the bar and with body-surfaces at an angle to the shanks. The bottom or under edges of the body of the teeth are convexed at their lower ends to a greater or less extent, and the upper edges at the same ends of the teeth are concaved, as shown best in Fig. 6; but the entire upper edge of the body of each tooth 18 is a cutting edge. These teeth serve to loosen the soil as it passes over the back of the share into the furrow. Suitable handles 19 are secured to the landside B, and these handles are usually connected also with the standard or beam A by means of suitable braces 20.

In connection with the share C, cutter D, and the loosening devices—namely, the teeth 18—a leveling and pulverizing device E is employed. This leveling and pulverizing device is usually connected with the plow by a clip or clamp 21, attached to the standard or beam A or other convenient place on the plow that will enable the leveling and pulverizing device to work in the furrow. When the clamp or clip 21 is secured to the beam A, said clamp is provided with an extension 22, that projects slightly downwardly and rearwardly and inwardly and rearwardly and in direction of the right-hand side of the plow, as illustrated in Fig. 1. A bar 23 is used in connection with the clamp 21 and its extension, and this bar consists of a horizontal head-section $a$ and a body-section $a'$, whose side faces are vertical. The head-section $a$ of the bar is provided with a pivot 24, that passes through the extension of the clamp 21, and said head-section $a$ of the bar 23 is further provided with a segmental slot 25, that receives a tightening-bolt 26, the bolt passing into the extension of the clamp, as is also shown in Fig. 1. This adjustment of the bar 23 with reference to the clamp 21 enables the leveling and pulverizing device to be carried to the right or to the left, as desired.

The shank 27 of the leveling and pulverizing device is made in two sections $e$ and $e'$, having a swivel connection 28 and a suitable tightening-bolt at said connection, and the shank 27 of the leveling and pulverizing device is pivoted at its forward end by a pin 29 to the forward portion of the body-section $a'$ of the supporting-bar 23. This swivel connection provided in the shank of the leveling and pulverizing device enables the ends of the rake-head of the leveling and pulverizing device to be adjusted properly with relation to the furrow, while a vertical adjustment of the entire leveler and pulverizer is accomplished through the medium of a lever 30, pivoted to the body-section $a'$ of the supporting-bar 23 and connected by a link 31 with the forward section of the shank of the leveler and pulverizer. The lever 30 is provided with a suitable thumb-latch adapted to engage with a rack 33, secured to the supporting-bar 23, as illustrated in Fig. 1.

The rear end 34 of the shank 27 of the leveling and pulverizing device is flattened horizontally, and the flattened portion is provided with a segmental slot 35. A carrying-plate 36 is located upon the flattened portion 34 of the said shank, as shown in Fig. 1, and the rear end of this plate is bifurcated. The ends of the members thus provided are formed with eyes 37, in which a rake-head 38 is mounted to turn. The body portion of the carrying-plate 36 is adjustably attached to the shank by passing a tightening-bolt 39 through the said body and through the segmental slot 35. This adjustment of the rake-heads enables the rake-teeth to be set at any desired angle to the furrow or straight and even with the furrow. The teeth $39^a$ of the rake-head are curved at their lower ends, and their forward edges are cutting edges.

The teeth $39^a$ may be placed at any desired angle vertically to the ground by turning the rake-head 38. This is accomplished through the medium of a handle 40, secured, preferably, to the central portion of the head 38, and this handle is moved along the surface of a rearwardly-curved guide-bar 41, which guide-bar is provided with a series of apertures, any one of which is adapted to receive a pin 42, and this pin is likewise intended to be passed through the handle 40 after the adjustment of the handle.

Having thus described my invention, I claim as new and desire to secure by Letters Patent—

1. In a plow, a share, a vertical cutter at the landside of said share, a portion of said cutter being curved over the share to direct the soil to the rear of said share and rearwardly-extending teeth mounted at the rear of said share and having upper cutting edges, substantially as described.

2. In a plow, a share, a vertical cutter at the landside of said share, teeth mounted at the rear of said share and having upper cutting edges, and a leveling and pulverizing device arranged to work in the furrow formed by the said share, substantially as described.

3. In a plow, a landside having the upper edge of its forward end inclined downward and forward, a plate secured at one of its ends on the beveled surface of the landside, a share carried by said plate, and a cutter at the landside of said share, the lower edge of the upper portion of said cutter being carried over upon the plate supporting the share, substantially as set forth.

4. In a plow, a share, a plate secured to the landside of the plow and carrying said share, a cutter at the landside end of the share, the said cutter being provided with a notch in one of its edges, the lower edge of the upper portion of the cutter extending over upon the plate carrying the share, the lower end of the opposing portion of the cutter engaging the landside of the plow, substantially as described.

5. In a plow, a landside having the upper edge of its forward end inclined downward and forward, a plate secured at one of its ends on the beveled surface of the landside and following the inclination of said surface, a share carried by said plate and having a point at the lower side of its landside end, the upper edge of said share at the landside end being cut away, a cutter located at the landside end of the share and provided with a notch in one of its edges, the lower edge of the upper portion of said cutter being carried over upon the plate supporting the share, the lower end of the lower portion of the cutter extending downward and engaging with the landside, the upper rear portion of the cutter having a curved inner surface to direct the soil to the rear edge of the share, the forward or cutting edge of the cutter inclining downwardly in direction of the point of the share, substantially as described.

6. In a plow, a share, a bar pivoted at the rear of the share, and adjustable in suitable bearings, means for holding the bar in the adjusted position, and a series of teeth secured to the bar and extending rearwardly, the said teeth having upper cutting edges, as and for the purpose set forth.

7. In a plow, a share, an adjustable bar pivoted at the rear of the share, means for holding the bar in the adjusted position, and a series of teeth secured to the bar and having upper cutting edges, the said teeth extending downwardly and rearwardly from the share and at an opposite angle thereto, substantially as set forth.

8. In a plow, a share, a plate secured to the rear of the share and connected with the landside of the plow, a bar pivoted at the rear of the share, the ends of the said bar being mounted to turn in brackets carried by the said plate and the landside of the plow respectively, means for holding the bar in the adjusted position, and rearwardly-extending teeth, attached to the said bar, for the purpose set forth.

9. In a plow a pulverizing and leveling device comprising a shank mounted at its forward end to have vertical and lateral movement, a support, a rake-head mounted to turn in the said support, means for adjusting the rake-head in the said support, the said support for the rake-head being adjustably connected with the rear end of the shank, whereby the rake-teeth may be set at any desired angle to the furrow, and means for raising and lowering the shank and the parts carried thereby, substantially as described.

10. In a plow, a leveling and pulverizing device, comprising a rake-head having teeth extending therefrom, a support in which the head is mounted to turn, an adjusting device for the head, a shank pivoted at its forward end whereby it has vertical and lateral movement, and having its rear end flattened and provided with a segmental slot, a bolt extending through the support and the slot of the shank, whereby the support and the rake-head can be adjusted to enable the rake-teeth to be set at any desired angle to the furrow, and means for raising and lowering the shank, and the parts carried thereby, substantially as set forth.

11. In a plow, a leveling and pulverizing device comprising a toothed head, a support in which the said head is mounted to turn, a device for rocking the said head, means for locking said device, and a shank formed in two sections having a swivel connection, one of said sections being connected with the support of the said head, the support being capable of lateral adjustment on the shank, and the other or forward section of the shank being pivoted at its forward end, for the purpose described.

12. In a plow, a leveling and pulverizing device, comprising a toothed head, a support in which the said head is mounted to turn, a device for rocking said head, means for locking said device, a shank made in two sections having a swivel connection, one of said sections being connected with the support of the said head and the other pivotally connected with a laterally-adjustable support, the support of the head being capable of lateral adjustment on the shank, and means for bodily raising and lowering the said leveling and pulverizing device, substantially as described.

13. In a plow, a leveling and pulverizing device comprising a shank formed in two sections having a swivel connection, a pivoted bar, having lateral adjustment and to which the forward section of said shank is pivoted, a lever pivoted to the said bar and connected by a link with the forward section of the shank, a support laterally adjustable on the rear section of said shank, a rake-head mounted to turn on said support, a handle secured to the rake-head, and a curved guide-bar to which said handle is adjustably secured, substantially as set forth.

FRANKLIN HOWLAND DAWES.

Witnesses:
MATTHEW GERAGHTY,
GEORGE W. KELLER.